United States Patent [19]

Schmidt et al.

[11] 4,260,704

[45] Apr. 7, 1981

[54] RESINS BASED ON NOVOLAKS, THEIR PRODUCTION AND THEIR USE AS TACKIFIERS

[75] Inventors: Manfred Schmidt, Krefeld; Theo Kemperman, Cologne; Dieter Freitag, Krefeld; Hermann Fries, Berg. Gladbach; Erich Esch, Leverkusen, all of Fed. Rep. of Germany

[73] Assignee: Bayer Aktiengesellschaft, Leverkusen, Fed. Rep. of Germany

[21] Appl. No.: 949,417

[22] Filed: Oct. 10, 1978

[30] Foreign Application Priority Data

Oct. 13, 1977 [DE] Fed. Rep. of Germany ....... 2746138

[51] Int. Cl.$^3$ .......................... C08G 8/28; C08L 61/14
[52] U.S. Cl. .................................... 525/501; 525/135; 525/137; 525/139; 525/140; 260/3
[58] Field of Search ................... 260/838, 3; 528/130, 528/131; 525/501, 135, 140

[56] References Cited

U.S. PATENT DOCUMENTS

| 3,650,102 | 3/1972 | Economy et al. ............... 528/131 X |
| 3,988,386 | 10/1976 | Hess et al. ........................ 260/838 X |
| 4,020,035 | 4/1977 | Edwards et al. ................. 260/838 X |

*Primary Examiner*—Wilbert J. Briggs, Sr.
*Attorney, Agent, or Firm*—Connolly and Hutz

[57] ABSTRACT

Resins having a softening point of from 50° to 130° C., an OH-number of from 250 to 400 and an iodine number of from 90 to 160, obtainable by reacting an alkyl phenol-formaldehyde novolak or an alkyl phenol mixture-formaldehyde novolak under acid-catalysed conditions with a polunuclear phenol or polynuclear phenol mixture and formaldehyde and/or an aliphatic aldehyde or aliphatic aldehyde mixture, the ratio by weight of the alkyl phenol or alkyl phenol mixture to the polynuclear phenol or polynyclear phenol mixture being from 2.2:1 to 1:10.

7 Claims, No Drawings

RESINS BASED ON NOVOLAKS, THEIR PRODUCTION AND THEIR USE AS TACKIFIERS

This invention relates to resins obtainable by reacting alkyl phenol-formaldehyde novolaks with polynuclear phenols and formaldehyde and/or aliphatic aldehydes, to their production and to their use as tackifiers for elastomers.

In the fabrication of rubber articles, such as tyres, rollers and hoses, the individual rubber mixtures, once made up, have to adhere firmly so that they do not separate again before final shaping by pressing and vulcanisation.

In many cases, synthetic rubbers and highly filled rubber mixtures are not tacky enough to guarantee sufficiently firm adhesion of the elastomer surfaces to be coupled during processing. Accordingly, it is necessary to add to the rubber mixtures before processing a tackifier which, in addition to maximum effectiveness, shows excellent compatibility both with the rubbers and with the mixture constituents incorporated in them and which does not have any significant adverse effect upon the processing, vulcanisation, ageing and physical properties of the vulcanisate.

Tackifiers normally used in the rubber industry are both natural resins and also synthetic resins in liquid, pasty but generally solid form. The natural resins normally used for this purpose are colophony, cumarone and indene resins.

Standard commercial-grade synthetic resins are generally resin condensates of phenol, xylene and/or alkyl phenol with aldehyde or acetylene. The alkyl phenol-/acetylene resins generally have the best tackifying effect.

It has now been found that resins obtainable by the acid-catalysed reaction of an alkyl phenol/formaldehyde novolak with a polynuclear phenol and formaldehyde and/or an aliphatic aldehyde distinctly increase the tackiness of the elastomer without at the same time adversely affecting the processing, ageing and physical properties of the vulcanisate.

The resins according to the invention are characterised in that the ratio by weight of the alkyl phenols used to the polynuclear phenol used is in the range of from 2.2:1 to 1:10, preferably from 1.5:1 to 1:4.

The alkyl phenol-formaldehyde novolak used as starting material may be prepared in a reaction step preceding the reaction according to the invention, so that the reaction as a whole can be carried out in a "one-pot process". This has various advantages, as shown in the following.

Condensation of the alkyl phenol or alkyl phenol mixture with formaldehyde may be carried out in known manner, a mixture of the alkyl phenol (or alkyl phenol mixture) with once to twice the molar quantity of formaldehyde, present in the form of paraformaldehyde, trioxane or an aqueous formalin solution, being reacted over a period of from 1 to 3 hours at temperatures of from 100° to 180° C. under pressures of from 1 to 7 atms in the presence of acid catalysts. The reaction may also be carried out in the presence of solvents, such as toluene, xylene, isobutanol or other solvents immiscible or only partly miscible with water, although it is preferably carried out in the absence of solvents.

The alkyl phenols used are alkyl phenols with a straight-chain or branched-chain alkyl or cycloalkyl radical having from 3 to 20 carbon atoms, preferably from 4 to 12 carbon atoms, in the o- or p-position. Standard commercial-grade alkyl phenols may also contain relatively small amounts of disubstituted alkyl phenols. It is particularly preferred to use p-tert.-butyl phenol and a commercial o-/p-nonyl phenol mixture containing from 10 to 20% by weight of o-isomers.

The acid catalysts used may be organic or inorganic acids, such as formic acid, acetic acid, trichloroacetic acid, p-toluene sulphonic acid, hydrochloric acid, phosphoric acid, sulphuric acid or mixtures of these acids, which are added in quantities of from 0.05 to 60 mole % and preferably in quantities of from 0.1 to 50 mole % (based on the alkyl phenol used). It is particularly preferred to use formic acid, p-toluene sulphonic acid, hydrochloric acid, sulphuric acid or phosphoric acid as the acid catalyst.

The alkyl phenol-formaldehyde novolak obtained is dissolved in a solvent, such as toluene, chlorobenzene, xylene or isobutanol, preferably in toluene or isobutanol, if this solvent has not already been used during the condensation reaction of the novolak. A polynuclear phenol (or a technical polynuclear phenol mixture) is then added. The solvent is used in a quantity of from 20 to 200% by weight and preferably in a quantity of from 30 to 100% by weight, based on the alkyl phenol used. The polynuclear phenol or technical polynuclear phenol mixture is used in a quantity of from 45 to 1000% by weight and preferably in a quantity of from 67 to 400% by weight, based on the quantity of alkyl phenol used.

Polynuclear phenols which may be used in accordance with the invention include 4,4'-dihydroxy diphenyl, 2,2-bis-(4-hydroxyphenyl)-propane (= bisphenol A), 2,2-bis-(4-hydroxyphenyl)-butane, 1,1-bis-(4-hydroxyphenyl)-cyclohexane and bis-(4-hydroxyphenyl)-diisopropyl benzene.

The technical polynuclear phenol mixture used may be, for example, the 2,2-bis-(4-hydroxyphenyl)-propane, generally known as bisphenol A, which accumulates in a purity of about 90% in its synthesis. This polynuclear phenol mixture also contains approximately 10% by weight of isomeric bisphenol A, trisphenols and 4-hydroxyphenyl indane.

It is preferred to use a technical polynuclear phenol mixture having the following composition:

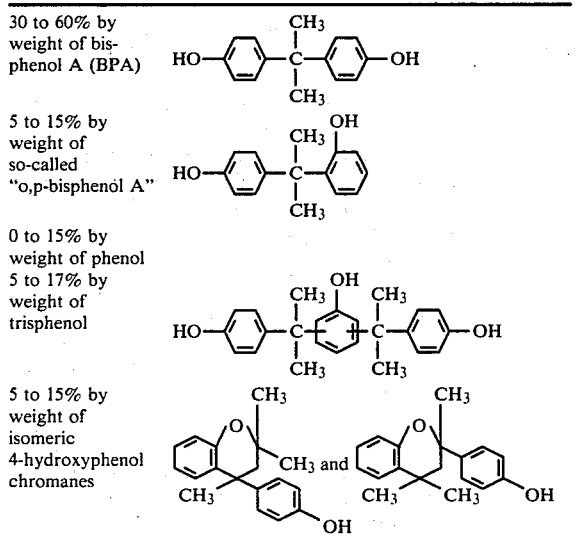

30 to 60% by weight of bisphenol A (BPA)

5 to 15% by weight of so-called "o,p-bisphenol A"

0 to 15% by weight of phenol 5 to 17% by weight of trisphenol 5 to 15% by weight of isomeric 4-hydroxyphenol chromanes

| | |
|---|---|
| 3 to 12% by weight of 4-hydroxyphenyl indane | 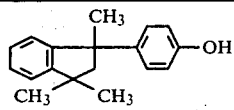 |

The solution of the alkyl phenol-formaldehyde novolak is reacted with the polynuclear phenol or polynuclear phenol mixture in known manner. The reaction time is preferably from 20 to 180 minutes. The reaction is preferably carried out at temperatures of from 100° to 150° C.

From 0.10 to 0.60 mole and preferably from 0.15 to 0.55 mole of aldehyde is introduced into the reaction mixture. Suitable aldehydes are formaldehyde, for example in the form of a 30 to 35% by weight aqueous formalin solution or paraformaldehyde, and/or aliphatic aldehydes preferably containing from 2 to 4 carbon atoms, such as acetaldehyde, propionaldehyde, butyraldehyde, isobutyraldehyde, croton aldehyde or mixtures of these aldehydes.

Where mixtures of formaldehyde and aliphatic aldehydes are used, the aliphatic aldehyde is present in a proportion of up to 0.1 mole and preferably in a proportion of from 0.05 to 0.08 mole.

The reaction mixture is kept boiling during the addition.

The molar quantities of the aldehdyes used are based on 1 mole of phenolic OH-groups in the polynuclear phenol or polynuclear phenol mixture. After a reaction time of from 1 to 4 hours, water is first removed by azeotropic distillation and the solvent is subsequently distilled off first under normal pressure and then in vacuo (at $P_{min} = 30$ Torr) at a heating bath temperature increasing to 150°–230° C.

The liquid viscous resin is removed from the reaction vessel and worked up. A preferred method of isolating the resin is to work up the resin solution after azeotropic removal of the water by means of a tubular coil evaporator which is surrounded by a medium heatable up to 230° C.

The softening point of the resins obtained lies between 50° C. and 130° C. and preferably between 75° C. and 100° C. By varying the quantities of aldehyde introduced for condensation of the mixture of alkyl phenol novolak and polynuclear phenol or polynuclear phenol mixture, it is possible to adjust the softening point of the resins accordingly, the softening point being increased by increasing the quantity of aldehyde introduced. The resins are characterised by OH-numbers of from 250 to 400, preferably from 270 to 370, and by iodine numbers of from 90 to 160, preferably from 110 to 140.

The resins are excellent tackifiers for elastomers, such as natural rubber (NR), styrene-butadiene copolymer (SBR), acrylonitrile-butadiene copolymer (NBR), polybutadiene (BR), polychloroprene (CR), polyisoprene (IR), isobutylene-isoprene copolymer (IIR), ethylene-propylene terpolymers (EPDM) and their mixtures with one another. The resins are added to rubber in quantities of from 0.3 to 8% by weight and preferably in quantities of from 1 to 6% by weight, based on the weight of the polymer. They are incorporated in conventional manner.

The tackifying effect of the resins extends to a variety of different compounds, such as hose compounds, roller compounds, tyre compounds, fabrication compounds, compression-moulding and injection-moulding compounds, to which fillers, such as carbon blacks, kaolin, silicas or plasticisers such as, for example, mineral oils or fatty acid esters are optionally added.

It was not possible to detect any deterioration in the processing properties of the rubber mixtures containing the tackifying resins in the usual quantities where the units normally used in the rubber industry, such as mixing rolls, Banbury mixers, calenders or extruders, are used for processing.

The tackifying resins may also be used for the production of rubber-based adhesives which contain SBR, NR, EPDM, butyl and/or chlorobutyl rubber and which are synthesised as solvent or emulsion adhesives.

The invention is illustrated by the following Examples.

EXAMPLE 1

A mixture of 450 g of a technical o/p-nonyl phenol mixture (o-isomer content: 15% by weight), 108 g of paraformaldehyde, 40 g of formic acid and 2 g of p-toluene sulphonic acid is intensively stirred for 1 hour at a heating bath temperature of 170° C. and under a pressure of 1 atmosphere. After cooling of the reaction mixture to 100° C., 250 ml of toluene and 1 kg of the technical polynuclear phenol mixture (containing 52% of bisphenol A isomer) are added. After reaction for 30 minutes at 130° C., a mixture of 130 g of 30% formalin solution and 30 g of propionaldehyde is added at such a rate that the reaction mixture remains on the boil (addition time: 15 minutes). The mixture is left to react for 2 hours under reflux with intensive stirring, after which the water is removed from the reaction mixture by azeotropic distillation. All the solvent is then distilled off first under normal pressure and then in vacuo (up to p = 30 Torr) at a heating bath temperature increasing to 180° C., after which the liquid viscous resin is removed from the reaction vessel and, after hardening, is ground. 1.6 kg of resin are obtained; softening point 77° to 80° C. OH-number = 315, iodine number = 115.

EXAMPLE 2

150 g of p-tert.-butyl phenol, 300 g of a technical o-/p-nonyl phenol mixture containing 15% by weight of o-isomer, 120 g of paraformaldehyde and 1 g of p-toluene sulphonic acid are heated for 3 hours with intensive stirring at a heating bath temperature of 170° C. Following the addition of 170 ml of isobutanol, 1 kg of the technical polynuclear phenol mixture (containing 52% of bisphenol A isomer) is introduced. The mixture is left to react for 2.5 hours while boiling under reflux, and 175 g of a 30% formalin solution are then added.

After a reaction time of 3 hours, the water is removed by azeotropic distillation, after which all the solvent is distilled off, first under normal pressure and then in vacuo at a bath temperature increasing to 230° C. The resin obtained (1.6 kg) has a softening point of 87° to 90° C.; OH-number = 320, iodine number = 120.

EXAMPLE 3

600 g of p-tert.-butyl phenol, 140 g of paraformaldehyde, 50 g of formic acid and 7 g of 85% phosphoric acid are reacted for 6 hours in the same way as in Example 2. Following the addition of 150 ml of isobutanol, 0.9 kg of the technical polynuclear phenol mixture (containing 52% of bisphenol A isomer) are introduced. The mixture is then left to react for 1.5 hours while boiling under reflux, after which a mixture of 150 g of a 30% formalin solution and 30 g of propionaldehyde is introduced over a period of 20 minutes at a heating bath temperature of 100° C. so that the reaction mixture remains on the boil. After reaction for 1.5 hours with intensive stirring at a heating bath temperature of 130° C., the water is removed by azeotropic distillation and the reaction mixture is worked up in the same way as described in Example 2.

The resin obtained (1.45 kg) has a softening point of 85° C.; OH-number = 358, iodine number = 122.

The tackifying resins are worked into standard rubber compounds (cf. incorporation Examples 4 to 6) by adding a weighed quantity of the tackifying resin, in the form of a paste, powder or granulate, to the rubber mixture together with the other fillers required. The tackifying resins may also be added at the end of the mixing cycle without any adverse effect uon the tackifying effect or upon the processing properties. However, it is important to ensure that, in cases where tackifying resins present in solid form are incorporated, the temperature of the mixture during processing exceeds the melting range of the tackifying resins in order to guarantee homogeneous distribution of the resin in the rubber compound.

The tackifying effect is evaluated by a method developed by applicants rather than by the usual methods. In this method, a constant load is applied (principle of a creep test) and the time required for two surfaces to be separated from one another is measured. This time is directly proportional to the tackifying effect and directly provides a measure of tackiness.

Test Procedure for Determining Tackiness (A detailed description of the test procedure is given in the brochure entitled "Prufung und Bewertung von Klebrigmachern (Testing and Evaluation of Tackifiers)" by E. Esch, Dr. H. Fries, H. Dahl, Dr. Th. Kempermann; Bayer AG, Sparte Kautschuk-Anwendungstechnik, February 1976). The two ends of a strip-form test specimen measuring 150 × 20 × 2 mm are pressed together over a surface of 20 × 10 mm for 30 seconds under a specific pressure of 3.5 MPa after the ends of the strip-form test specimen have been placed together to form a ring in such a way that the two sides coated with rubber compound lie one on top of the other. The ring thus formed is placed over a loose roller. Another movable roller to which different weights can be applied, as noted in the test Examples, is then suspended from the lower loop. After the load roller has been attached, the period of time elapsing until the joined contact surfaces of the test specimen have completely separated from one another is determined, being directly proportional to the degree of tackiness, i.e. the adhesion of the bonded rubber parts.

Production of the rubber compounds and test specimens: the compounds mentioned in the following Examples, whose fabrication tackiness is to be measured, were mixed in a Banbury mixer in the usual way and in the mixing sequence normally adopted in the rubber industry, the tackifying resins and vulcanisation accelerators being subsequently mixed on mixing rolls.

The test compounds were rolled out into sheets 1.2 to 1.3 mm thick which, after storage for 24 hours, were placed on a cotton fabric (300 × 300 mm) coated with polychloroprene adhesive and, after the surface of the compound had been covered with holland cloth and the surface of the fabric with cellophane in a frame measuring 300 × 300 × 2 mm, were pressed between steel plates in a conventional daylight press for 5 minutes under a pressure of 200 kp/cm$^2$ at a temperature of 110° C. Test specimens mesuring 150 × 20 mm were punched out of the sheets thus obtained.

1 hour before the tackiness is to be measured (the period for which the test specimens are stored has no effect upon tackiness), the holland cloth is removed and both ends of the test strip are coated with n-hexane over a surface of 20 × 10 mm. After an evaporation time of 5 minutes, the test specimens are joined together to form a ring in the manner described above the tackiness is measured.

The following examples describe the compounds of the tackifying resins with the elastomers or elastomer mixtures and list the test conditions and the results of the tackiness tests.

EXAMPLE 4

|  | 4.1 | 4.2 | 4.3 | 4.4 | 4.5 |
|---|---|---|---|---|---|
| Buna Huls 1712 | 103 | 103 | 103 | 103 | 103 |
| Buna CB 11 | 25 | 25 | 25 | 25 | 25 |
| zinc oxide | 5 | 5 | 5 | 5 | 5 |
| carbon black N 220 | 75 | 75 | 75 | 75 | 75 |
| aromatic mineral oil plasticiser | 12 | 12 | 12 | 12 | 12 |
| stearic acid | 2 | 2 | 2 | 2 | 2 |
| sulphur | 1.8 | 1.8 | 1.8 | 1.8 | 1.8 |
| benzothiazyl-2-cyclohexyl sulphenamide | 1.2 | 1.2 | 1.2 | 1.2 | 1.2 |
| acetylene/p-tert.-butyl-phenol addition product* | — | 4 | — | — | — |
| resin according to Example 1 | — | — | 4 | — | — |
| resin according to Example 2 | — | — | — | 4 | — |
| resin according to Example 3 | — | — | — | — | 4 |

*(for comparison) a commercial product of BASF AG.

EXAMPLE 5

|  | 5.1 | 5.2 | 5.3 | 5.4 | 5.5 |
|---|---|---|---|---|---|
| Perbunan N 3307 NS | 100 | 100 | 100 | 100 | 100 |
| carbon black N 550 | 10 | 10 | 10 | 10 | 10 |
| carbon black N 762 | 40 | 40 | 40 | 40 | 40 |
| mercaptobenzimidazole | 1 | 1 | 1 | 1 | 1 |
| trimethyl dihydro-quinoline | 1 | 1 | 1 | 1 | 1 |
| stearic acid | 1 | 1 | 1 | 1 | 1 |
| zinc oxide | 5 | 5 | 5 | 5 | 5 |
| sulphur | 0.2 | 0.2 | 0.2 | 0.2 | 0.2 |
| tetramethyl thiuram disulphide | 2.5 | 2.5 | 2.5 | 2.5 | 2.5 |
| benzthiazyl-2-sulphene morpholide | 2 | 2 | 2 | 2 | 2 |
| ester plasticiser | 10 | 10 | 10 | 10 | 10 |
| acetylene/p-tert.-butyl-phenol addition product* | — | 4 | — | — | — |
| resin according to Example 1 | — | — | 4 | — | — |
| resin according to Example 2 | — | — | — | 4 | — |
| resin according to Example 3 | — | — | — | — | 4 |

*(for comparison)

EXAMPLE 6

|  | 6.1 | 6.2 | 6.3 | 6.4 | 6.5 |
|---|---|---|---|---|---|
| Buna AP 451 | 100 | 100 | 100 | 100 | 100 |
| stearic acid | 1 | 1 | 1 | 1 | 1 |
| carbon black N 550 | 50 | 50 | 50 | 50 | 50 |
| naphthenic mineral oil plasticiser | 10 | 10 | 10 | 10 | 10 |
| zinc oxide | 5 | 5 | 5 | 5 | 5 |
| sulphur | 1.5 | 1.5 | 1.5 | 1.5 | 1.5 |
| mercaptobenzthiazole | 0.5 | 0.5 | 0.5 | 0.5 | 0.5 |

-continued

|  | 6.1 | 6.2 | 6.3 | 6.4 | 6.5 |
|---|---|---|---|---|---|
| tetramethyl thiuram di-sulphide | 1.5 | 1.5 | 1.5 | 1.5 | 1.5 |
| acetylene/p-tert.-butyl-phenol addition product | — | 5 | — | — | — |
| resin according to Example 1 | — | — | 5 | — | — |
| resin according to Example 2 | — | — | — | 5 | — |
| resin according to Example 3 | — | — | — | — | 5 |

*(for comparison)

Test Conditions and Test Results

For Example 4:

| Contact pressure under which the ends of the test specimens are joined together: | 3.5 | MPa |
|---|---|---|
| Period of application of the contact pressure: | 30 | seconds |
| Weight applied to separate the surfaces of the test specimen: | 12.5 | N |

Results:

| Example | Separation time (seconds) |
|---|---|
| 4.1 | 35 |
| 4.2 | 61 |
| 4.3 | 100 |
| 4.4 | 98 |
| 4.5 | 108 |

The test results represent the average values of five test runs.

For Example 5:

| Contact pressure under which the ends of the test specimens are joined together: | 3.5 | MPa |
|---|---|---|
| Period of application of the contact pressure: | 5 | Seconds |
| Weight applied to separate the surfaces of the test specimen: | 15 | N |

Results

| Example | Separation time (seconds) |
|---|---|
| 5.1 | 170 |
| 5.2 | 195 |
| 5.3 | 244 |
| 5.4 | 246 |
| 5.5 | 235 |

The test results represent the average values of five test runs.

For Example 6:

| Contact pressure under which the ends of the test specimens are joined together: | 3.5 | MPa |
|---|---|---|
| Period of application of the contact pressure: | 30 | seconds |
| Weight applied to separate the surfaces of the test specimen: | 12.5 | N |

Results

| Example | Separation time (seconds) |
|---|---|

For Example 6:

| 6.1 | 59 |
|---|---|
| 6.2 | 22 |
| 6.3 | 85 |
| 6.4 | 85 |
| 6.5 | 88 |

The test results represent the average values of five test runs.

We claim:

1. Novolak resins having a softening point of from 50° to 130° C., an OH-number of from 250 to 400 and an iodine number of from 90 to 160, obtainable by reacting
    (a) an alkyl phenol-formaldehyde novalak or an alkyl phenol mixture-formaldehyde novolak produced by reacting an alkyl phenol or an alkyl phenol mixture with one to two times the molar quality of formaldehyde in the presence of acid catalyst at temperatures of from 100° to 180° C.
    (b) with (i) a polynuclear phenol or polynuclear phenol mixture and (ii) a member selected from the group consisting of formaldehyde, an aliphatic aldehyde, aliphatic aldehyde mixture and mixtures thereof, under acid-catalyzed conditions, the ratio by weight of the alkyl phenol or alkyl phenol mixture to the polynuclear phenol or polynuclear phenol mixture being from 2.2:1 to 1:10.

2. Resins as claimed in claim 1 having a softening point of from 75° to 100° C., an OH-number of from 270 to 370 and an iodine number of from 110 to 140.

3. Resins as claimed in claim 1, characterised in that the alkyl phenol-formaldehyde novolak used as starting material for the reaction is produced by reacting alkyl phenols or mixtures of alkyl phenols, which have a straight-chain or branched-chain alkyl or cycloalkyl radical with 3 to 20 carbon atoms in the o- and/or p-position, with from 1 to 2 moles of formaldehyde per mole of alkyl phenol.

4. Resins as claimed in claim 1, characterised in that the polynuclear phenol used is 4,4-dihydroxydiphenyl, 2,2-bis-(4-hydroxyphenyl)-propane, 2,2-bis-(4-hydroxyphenyl)-butane, 1,1-bis-(4-hydroxyphenyl)-cyclohexane and/or bis-(4-hydroxyphenyl)-p-diisopropyl benzene.

5. Resins as claimed in claim 1, characterised in that the reaction of the alkyl phenol-formaldehyde novolak with the polynuclear phenol or polynuclear phenol mixture is carried out in the presence of from 0.1 to 0.6 mole of an aldehyde.

6. A process for producing the resins claimed in claim 1, characterised in that an alkyl phenol-formaldehyde novolak or an alkyl phenol mixture-formaldehyde novolak is reacted under acid-catalysed conditions with a polynuclear phenol or polynuclear phenol mixture and formaldehyde and/or an aliphatic aldehyde or aliphatic aldehyde mixture, the ratio by weight of the alkyl phenol or alkyl phenol mixture to the polynuclear phenol or polynuclear phenol mixture being from 2.2:1 to 1:10.

7. The use of the resins claimed in claim 1 as tackifiers for the production of rubber mixtures adhering to one another.

* * * * *